(12) United States Patent　(10) Patent No.: US 7,564,854 B2
Pong　(45) Date of Patent: Jul. 21, 2009

(54) NETWORK ARCHITECTURE WITH A LIGHT-WEIGHT TCP STACK

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 489 days.

(21) Appl. No.: 11/524,719

(22) Filed: Sep. 20, 2006

(65) Prior Publication Data

US 2008/0069116 A1　Mar. 20, 2008

(51) Int. Cl.
H04L 12/28　(2006.01)
(52) U.S. Cl. ................................. 370/395.52; 709/227
(58) Field of Classification Search ....................... None
See application file for complete search history.

(56) References Cited

U.S. PATENT DOCUMENTS 7,269,654 B2 * 9/2007 Srinivas ..................... 709/227
2003/0217149 A1 * 11/2003 Crichton et al. ............ 709/225
2005/0138189 A1 * 6/2005 Tripathi et al. ............. 709/230
2005/0271042 A1 * 12/2005 Johnson ..................... 370/352
2006/0075119 A1 * 4/2006 Hussain et al. ............. 709/227

* cited by examiner

*Primary Examiner*—Phirin Sam
(74) *Attorney, Agent, or Firm*—Farjami & Farjami LLP

(57) ABSTRACT

In one aspect, there is provided a method for use by an edge device for establishing a connection with a server to support a full TCP connection between a client and the edge device. The method comprises establishing a full TCP connection with the server using a full TCP socket, allocating a first light TCP socket for supporting a first light TCP connection with the server, associating a first light session ID with the first light TCP connection, sending a first open session message to the server via the full TCP connection with the server, establishing the first light TCP connection with the server via the full TCP connection, associating first data with the first light session ID, and delivering the first data associated with the first light session ID to the server using the first light TCP connection via the full TCP connection.

20 Claims, 6 Drawing Sheets

NETWORK ARCHITECTURE WITH A LIGHT-WEIGHT TCP STACK

BACKGROUND OF THE INVENTION

1. Field of the Invention

The present invention relates generally to network architectures. More particularly, the present invention relates to methods and systems for implementing a light-weight TCP stack for use in networks.

2. Background Art

Today, the Internet uses a variety of technologies to provide end-to-end communication between applications on different computers. Most applicants use Transport Control Protocol (TCP) and Internet Protocol (IP) (TCP/IP) to achieve this end-to-end communication. TCP/IP is a suite of protocols designed to allow communication between networks regardless of the technologies implemented in each network. The concept that underlies the creation and development of TCP/IP is generally referred to as internetworking. An important fundamental idea that defines the internetworking is known as layering or modularity. For example, FIG. 3 of the present application illustrates various layers of TCP/IP stack 300.

As shown in FIG. 3, TCP/IP stack 300 includes application layer 305, transport layer 310, network layer 315, data-link layer 320 and physical layer 325. Application layer 305 is a user process cooperating with another process on the same or a different host. Examples of application layer 305 include telnet (protocol for remote terminal connections), FTP (file transfer protocol), RPC (remote procedure calls), SMTP (e-mail), TFTP (trivial file transfer protocol), DNS (domain name server) and NFS (network file system). Transport layer 310 provides end-to-end data transfer. The most common example transport layer 310 protocols are TCP, UDP (User Datagram Protocol) and ICMP (Internet Control Message Protocol). Network layer 315 provides a virtual network image of the internetwork and, in doing so, shields the higher layers from the lower network structure. IP is the best known of network layer 315 protocols. Data-link layer 320 provides an interface to the actual network hardware. TCP/IP can use almost any protocol present at this point, which is made possible by the flexibility provided from the IP layer. For example, the protocol IEEE 802.2 is used as an API (Application Program Interface) for connection to the IEEE 802.3 ethernet. Lastly, physical layer 325 is purely the hardware layer, such as the cable, radio-wave, satellite and network interface card.

As a packet is received by a host, the packet enters the lowest point of TCP/IP stack 300, which is physical layer 325, and travels the sequence of layers 305-325 that make up TCP/IP stack 300. Each layer then proceeds to strip-out the data it needs and passes the remaining packet, if required, to the next layer up in the stack. Likewise, when application layer 305 creates a packet, application layer 305 will pass the packet down to the next layer where further information is added by each and every subsequent layer until the packet emerges onto physical layer 325 as a full TCP/IP packet. As an example, a 30-byte packet created by application layer 305 may be sent to transport layer 310, e.g. TCP, where 20 bytes of TCP header are added to the packet. Thereafter, 20 bytes of IP header may be added by network layer 15 to the packet, and 22 bytes of ethernet header may be added by data-link layer 320, before a full packet of 96 bytes arrives at physical layer 325 for transmission in the network. Similarly, when a packet arrives at physical layer 325, data are stripped out from the packet at each layer until a 30-byte packet arrives at application layer 305.

Now, turning to FIG. 1, it illustrates conventional network communication 100 using full TCP stack implementations at each end of the network. Edge device 110, such as a load-balancer, firewall or a NAT (Network Access Translation) device, often sits at the edge of the network for terminating client TCP connections 105 and providing a bridge to servers 120, 130 and 140 via private connections 116, 117 and 118. As shown, edge device 110 includes full TCP stack implementation (FTSI) 115 for establishing a plurality of FTSI private connections with each of the plurality of servers 120, 130 and 140, where each server 120, 130 and 140 also includes FTSI 125, 135 and 145, respectively, for supporting FTSI private connections 116, 117 or 118. For example, when edge device 110 receives a client connection request, edge device 110 transmits a request to one of servers 120, 130 or 140 for establishing a private connection 116, 117 or 118, respectively, using a full-blown TCP stack implementation. In other words, each and every M1 connections 116, M2 connections 117 and M3 connections 118 is supported by a full-blown TCP stack implementation at each respective server 120, 130 and 140, where N client connections 105 is equal to the total of M1 connections 116, M2 connections 117 and M3 connections 118. In other words, if M1 connections include five connections, and five full-blown TCP sessions are initiated to support the five connections. This conventional network architecture, however, is quite inefficient and burdensome for servers 120, 130 and 140, and edge device 110, because an excessive amount processing overhead is created for each private connection that is supported by an end-to-end full-blown TCP stack implementation. For example, on a per-session basis, each full-blown TCP stack implementation includes a full-fledged socket/TCP/IP data structure, retransmission handling, timer management, populated lookup table, session open and tear-down, and so on.

FIG. 2 illustrates conventional network communication 200 including edge device 110 and server 120. Edge device includes listening socket 210 for monitoring client request for a TCP/IP connection. When edge device 110 receives a client connection request using listening socket 210, edge device 110 starts a thread, such as a thread 212, 222 or 232, for establishing a TCP/IP session for a connection with the client for supporting a client connection, such as client connection 202, 204 or 206, and also for establishing a TCP/IP session for supporting a connection with server 120. Edge device 110 creates a socket shown in FTSI/socket 215 for a client connection, and creates a socket shown in FTSI/socket 218 for a connection with server 120, such as private connection 242, 244 or 246.

A socket is required on each of edge device 110 and server 120 for a valid connection, i.e. two sockets per connection, and each of edge device 110 and server 120 will keep track of the sockets currently in use. Each socket contains the numeric IP address of the local host, the local port number and the port number of the TCP/IP service on the remote host. Each socket is uniquely numbered and valid only for the duration of the connection. The socket number is recycled when the connection is completed. When server 110 sends a connection request to server 120 asking for permission to use the remote service, server 120 uses listening socket 250 for monitoring and receiving such request to start a thread, such as thread 252, 262 or 272, for establishing a TCP/IP session for supporting a connection with edge device 110. The initial request from edge device 110 includes IP address of server 120, the port number of the requested service from server 120 and the local socket number, i.e. the originating socket number of edge device 110. As a result of this initial request, server 120 creates its own socket 255, 265 or 275 to use for the duration of the connection 242, 244 or 246, respectively. Server 120 then replies with an acknowledgement which contains server 120 socket information directed back to the originating socket address of edge device 110.

For example, once client connection 202 between edge device 110 and a client using the socket in FTSI/socket 215 is established and confirmed, FTSI/socket 215 provides a full implementation of TCP stack for data communications between the client device and edge device 110. Similarly, once private connection 242 between edge device 110 and server 120 using the sockets in FTSI/socket 218 and FTSI/socket 255 is established and confirmed, FTSI/socket 218 and FTSI/socket 255 provide full implementations of TCP stack for data communications between edge device 110 and server 120. At this point, the client can then use the desired application on server 120. When the client ends the connection with edge device 110, edge device 110 in turn ends the connection with server 120. Likewise, client connections 204 and 206 can made via FTSI/socket 225 and FTSI/socket 235, respectively, and private connections 244 and 246 can made via FTSI/socket 228, FTSI/socket 265, FTSI/socket 238 and FTSI/socket 275, in response to other client requests through edge device 110 for using services or applications on server 120.

However, the above-described conventional approach suffers from many inefficiencies and a tremendous overhead for edge device 110 and server 120, since each of private connections 242, 244 and 246 must be supported by a full TCP stack implementation at edge device 110 and a full TCP stack implementation at server 120, e.g. FTSIs of FTSI/socket 218, 228 and 238 and FTSIs of FTSI/socket 255, 265 and 275. As a result, on a per-session-basis, each full-blown TCP stack implementation—in this case three sets of FTSI to support three private connections—includes a tremendous overhead of a full-fledged socket/TCP/IP data structure, retransmission handling, timer management, populated lookup table, session open and tear-down, and so on.

Accordingly, there is a need in the art to provide a higher performance and resource efficient network architecture that overcomes the inefficiencies of the conventional network architecture and its undesirable full TCP stack overhead that is required for each connection.

SUMMARY OF THE INVENTION

There are provided systems and methods for implementing a light-weight TCP stack for use in networks, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
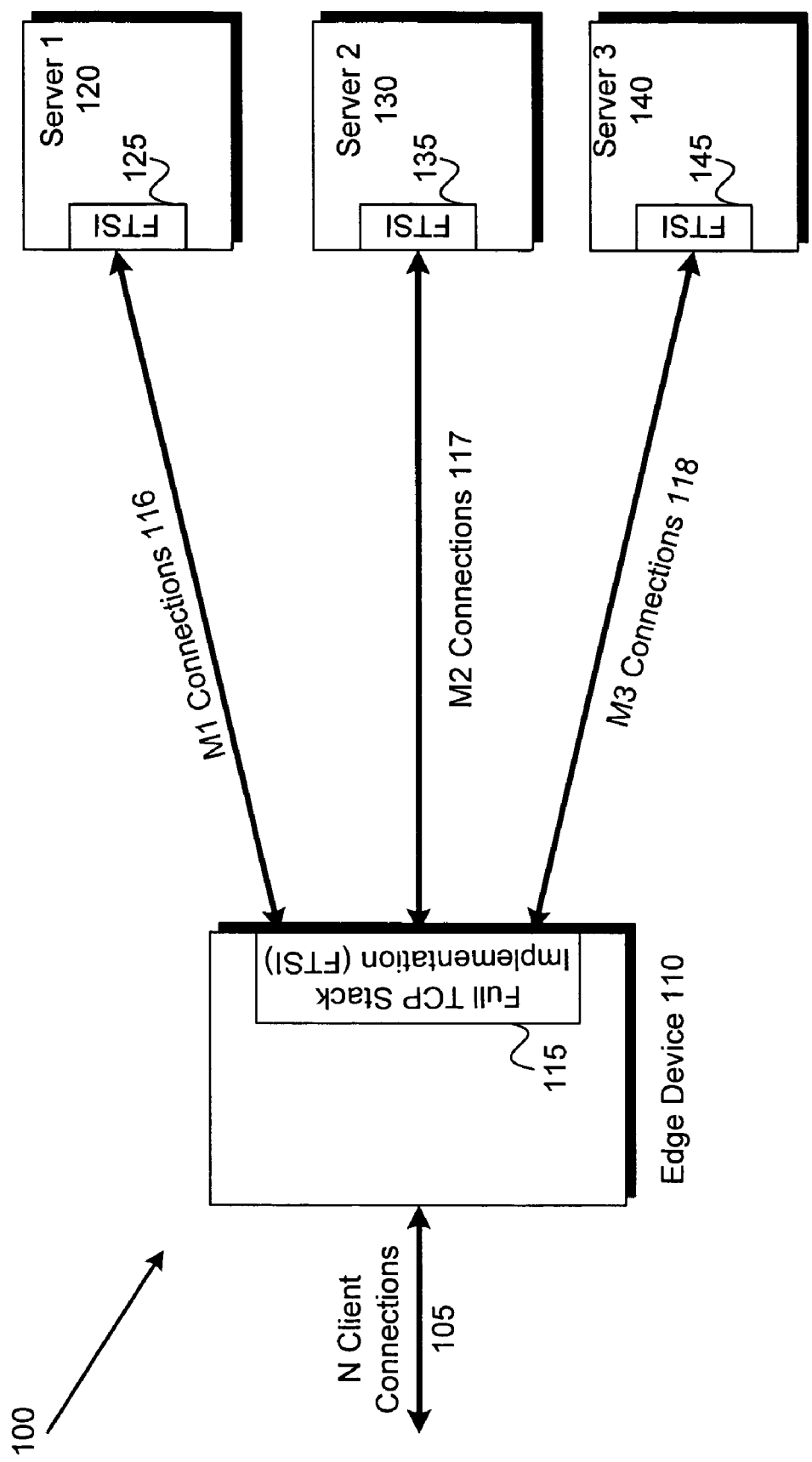
FIG. 1 is a block diagram illustrating a conventional network communication using full TCP stack implementations at each end of the network.
Figure 2:
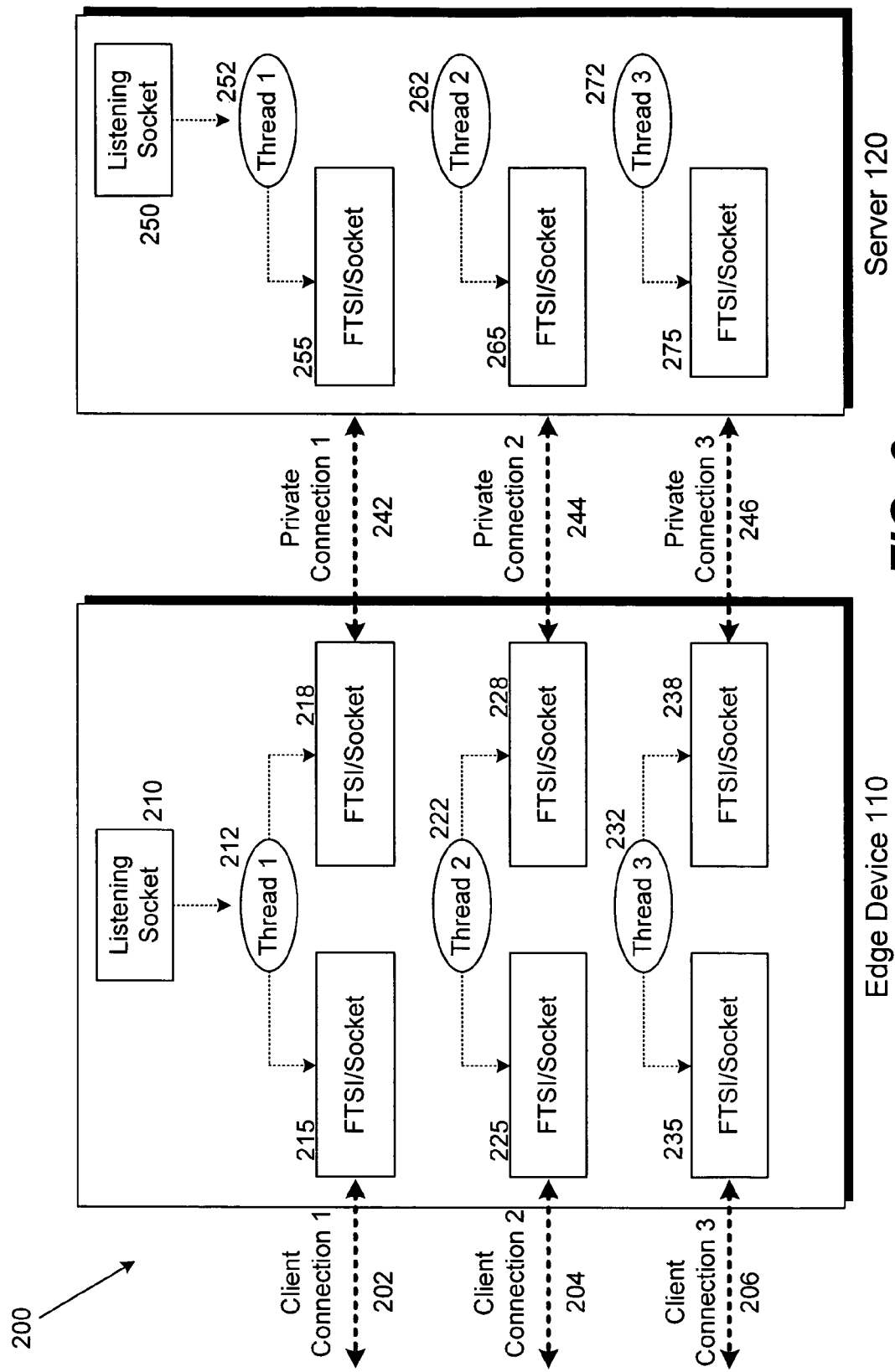
FIG. 2 is a block diagram illustrating an implementation of a network communication of FIG. 1 via an edge device and a server using full TCP stack implementations at each end of the network.
Figure 3:
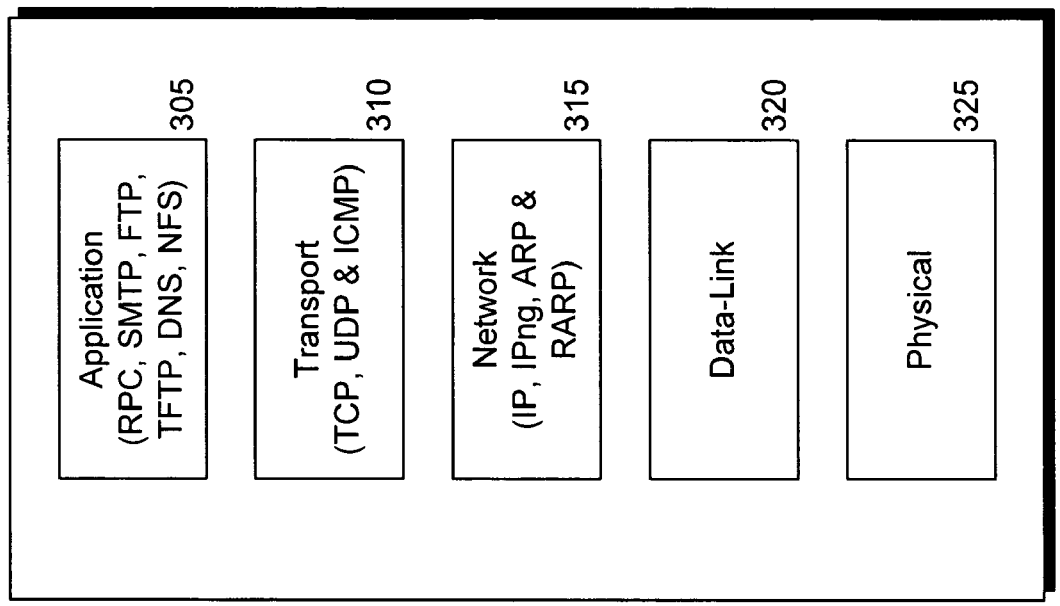
FIG. 3 is a block diagram illustrating various layers of a TCP/IP stack.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 4:
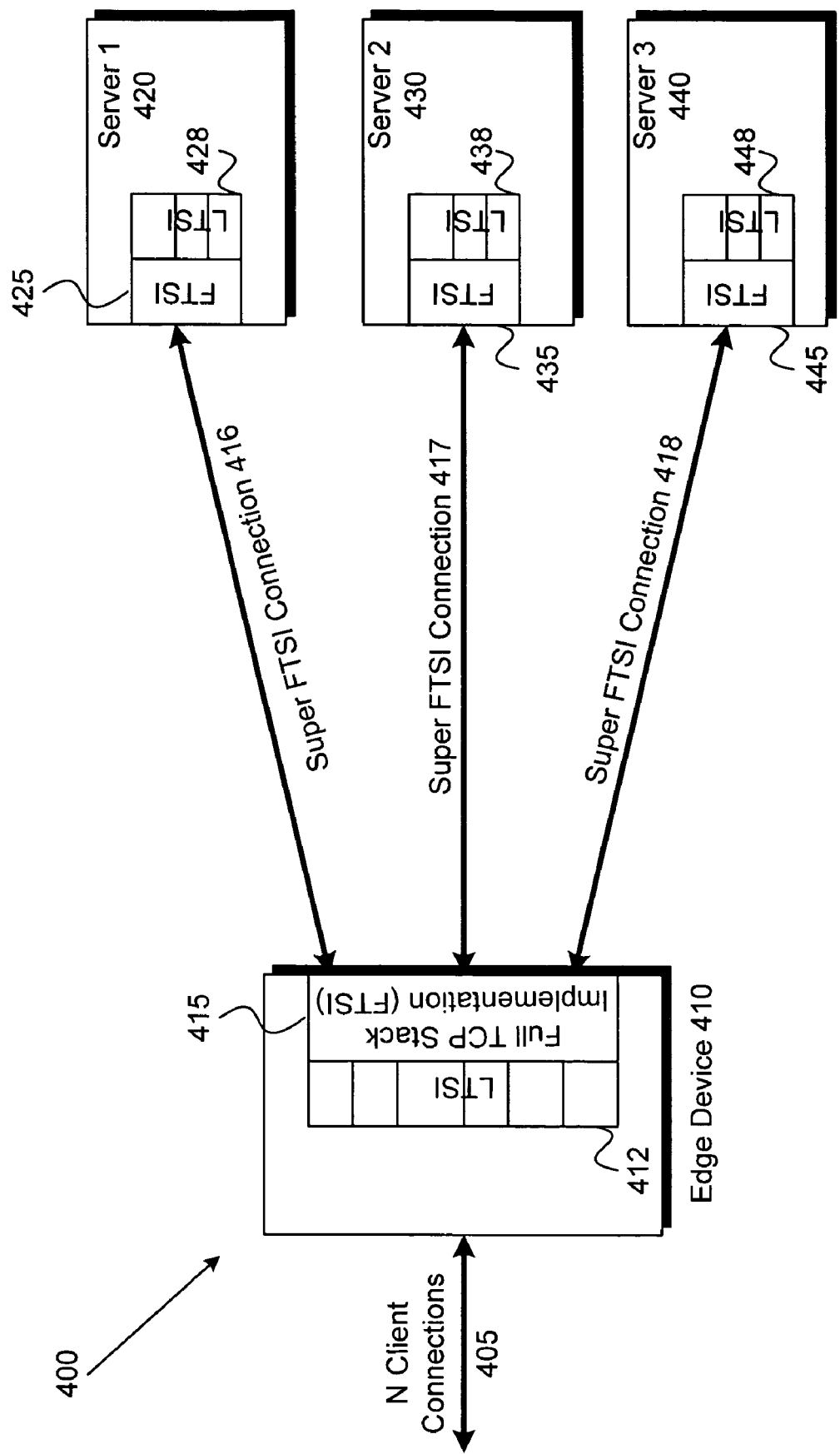
FIG. 4 is a block diagram illustrating a network communication using light TCP stack implementations over a super FTSI connection, according to one embodiment of the present invention.

FIG. 4 is a block diagram illustrating network communication 400 using light TCP stack implementations (LTSI) over super FTSI connection 416, 417 or 418, according to one embodiment of the present invention. Edge device 110, such as a load-balancer, firewall or a NAT device, is placed at the edge of the network for terminating client TCP connections 405 and providing a bridge to server(s) 420, 430 and 440 via super FTSI connection 416, 417 and 418. As shown, edge device 410 includes light TCP stack implementations 412 and full TCP stack implementation 415 for establishing one super FTSI connection per server 420, 430 and 440, where each server 420, 430 and 445 also includes FTSI 425, 435 and 445, respectively, for supporting a plurality of LTSI connections over each super FTSI connection using LTSI 412 at edge device 410 and LTSI 428, 438 and 448 at each server 420, 430 and 440, respectively. For example, when edge device 410 receives a client connection request, edge device 410 transmits a request to one of servers 420, 430 or 440 for establishing a super FTSI connection 416, 417 or 418, respectively, using a full-blown TCP stack implementation, if the super FTSI connection does not already exist. However, if the super FTSI connection already exists between edge device 420 and that particular server, the above step is not needed to be performed. Once the super FTSI connection is established or confirmed to exist, a light TCP stack implementation is used for data communication between the server and edge device 410 over the super FTSI connection, which will be discussed in further detail below. A super FTSI connection is a full-blown TCP stack implementation that can support one or more LTSI connections, where each LTSI connection is identified by a unique identification number. An LTSI connection is a connection with less overhead than an FTSI connection and that runs on top of the FTSI connection and uses a unique identification number to identify itself. For example, an LTSI connection may have less overhead than an FTSI connection for socket/TCP/IP data structure, retransmission handling, timer management, lookup table or session open and teardown.

According to one embodiment of the present invention, only a single FTSI connection is used between each server 420, 430 or 440 and edge device 410, and one or more LTSI connections are established over the single FTSI connection. As a result, the overhead of establishing an FTSI connection for each and every client connection is substantially reduced by an implementation of the present invention. Of course, in other embodiments of the present invention, there can be a plurality of FTSI connections between each server 420, 430 or 440 and edge device 410, where each of the plurality of FTSI connections supports one or more LTSI connections. A person of ordinary skill in the art would recognize that such changes can be made to the invention of the present application in form and detail without departing from the spirit and the scope of the invention.

Figure 5:
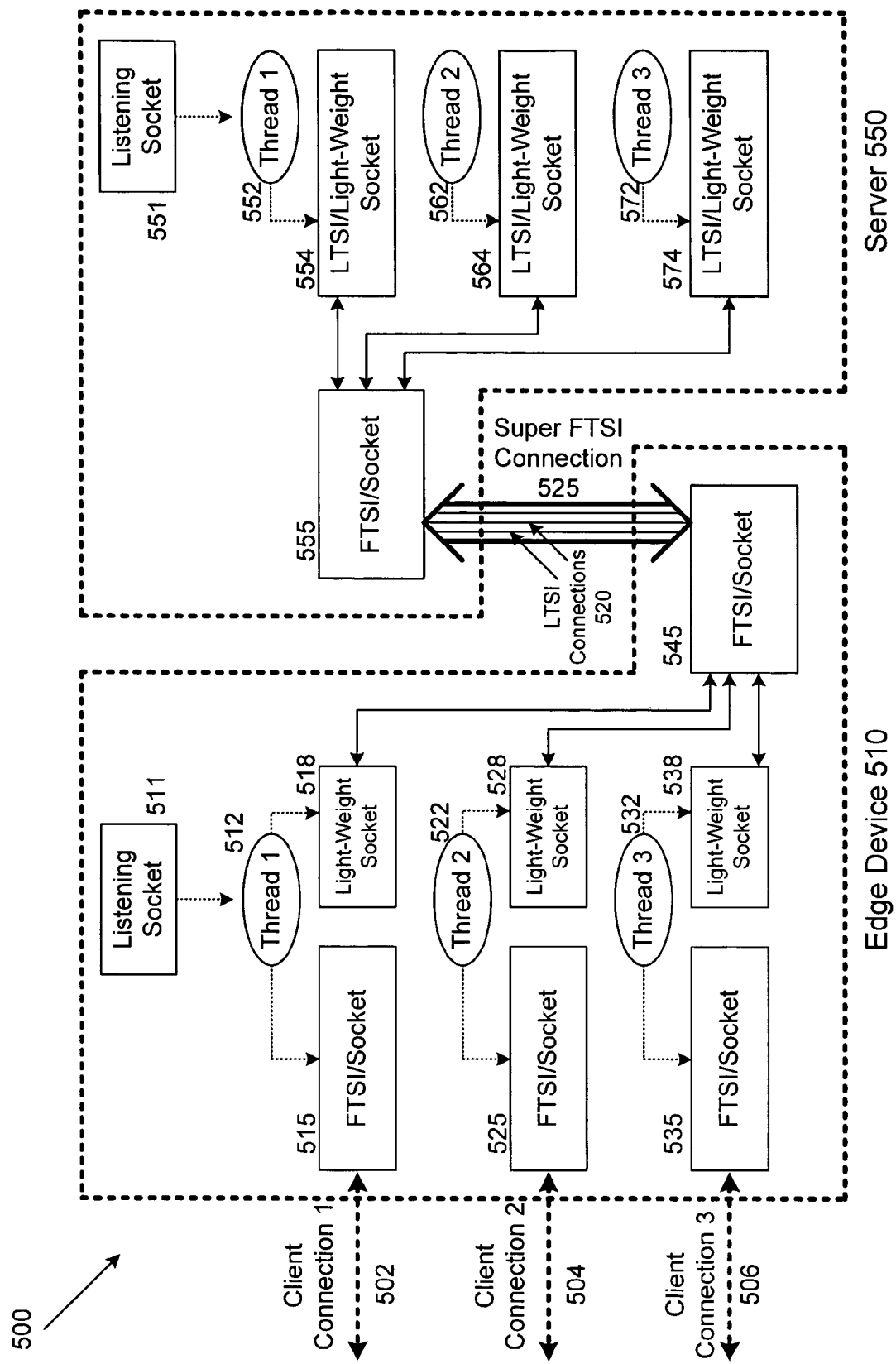
FIG. 5 is a block diagram illustrating an implementation of a network communication of FIG. 4 via an edge device and a server using light TCP stack implementations over a super FTSI connection, according to one embodiment of the present invention.
Figure 6:
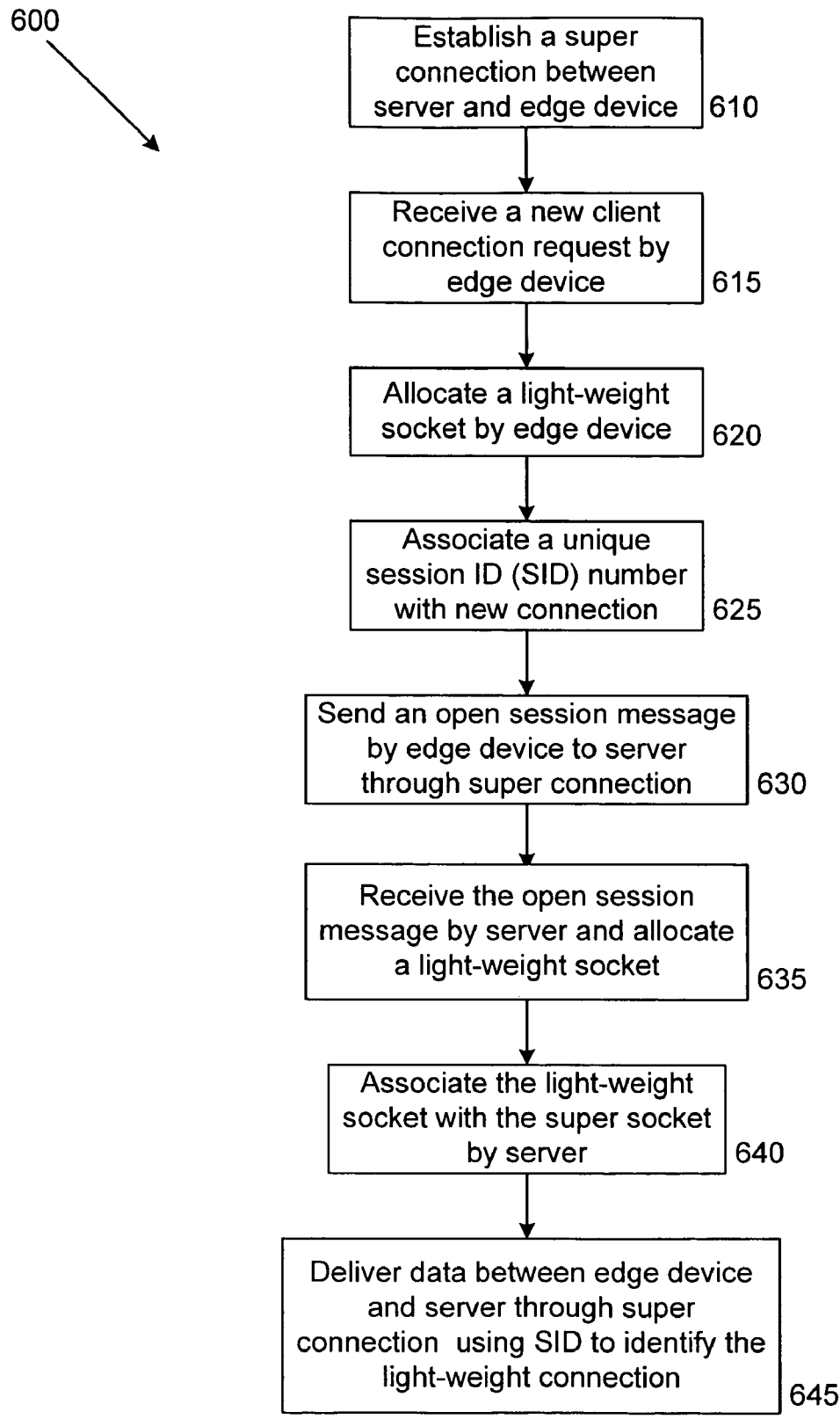
FIG. 6 is a flow diagram illustrating an implementation of a network communication of FIG. 4 via an edge device and a server using light TCP stack implementations over a super FTSI connection, according to one embodiment of the present invention.

FIG. 5 is a block diagram illustrating network communication 500 using edge device 510 and server 550 with light TCP stack implementations 520 over super FTSI connection 525, according to one embodiment of the present invention. With reference to FIG. 6, which illustrates a flow diagram of light TCP stack method 600 using communication network 500, light TCP stack method 600 begins at step 610, where super FTSI connection 525 is established between edge device 510 and server 550 by FTSI/socket 545 and FTSI/socket 555, respectively, using a conventional approach. In one embodiment, once super FTSI connection 525 is established, super FTSI connection 525 remains in place regardless of whether super FTSI connection 525 is used for a client connection. Next, at step 615, edge device 510 receives a client connection request from a client device (not shown) for establishing client connection 502, 504 or 506. This client connection request is detected by listening socket 511, which monitors the client side of edge device 510 for a connection request. Once listening socket 511 receives the client connection request, edge device 510 begins a new thread, such as thread 512, 522 or 532, for establishing a new connection with the client and server 550. For example, as shown in FIG. 5, thread 512, 522 or 532 creates FTSI/socket 515, 525 or 535, respectively, for supporting connection 502, 504 or 506, respectively, with the client.

Further, at step 620, thread 512, 522 or 532 creates lightweight socket 518, 528 or 538, respectively, for supporting light TCP connections 520 via super FTSI connection 525, which are supported by light-weight socket 518, 528 or 538 and FTSI/socket 545, respectively. Light-weight socket 518, 528 or 538 is an extension of conventional FTSI socket for supporting light TCP connections over an FTSI connection. Next, at step 625, edge device 510 associates a unique session ID (SID) with the new light TCP connection that is to be established over FTSI connection 525. At step 630, edge device 510 sends an open session message (MSG_TCP_OPEN) to server 550 over super FTSI connection 525 to open a new light TCP connection that will be associated with the new SID.

At step 635, listening socket 551 of server 550 detects the open session message and opens thread 552, 562 or 572 in response thereto. At step 640, server 550 associates LTSI/light-weight socket 554, 564 or 574 with FTSI/socket 555 and super FTSI connection 525, and light TCP connection 520 is established between edge device 510 and server 550 via super FTSI connection 525. Once light TCP connection 520 is established, at step 645, edge device 510 and server 550 start exchanging data packets using the new SID to identify the newly established light TCP connection 520 via super FTSI connection 525.

In one embodiment of the present invention, light TCP implementation can be achieved without modifying the conventional socket semantic or changing the application layer. In one embodiment, a single persistent connection may be established between edge device 510 and server 550 to support all client connections with server 550. In accordance with such embodiment, the need for a look-up table for tracking FTSI connections is eliminated, since there is only a single FTSI connection, namely supper FTSI connection, that supports all light TCP connections with server 550. As a result, TCP/IP processing overhead, including full-fledged socket/TCP/IP data structure, retransmission handling, timer management, populated lookup table, session open and teardown, and so on, is reduced to the overhead for a single super FTSI connection. In addition, data structures for light TCP stack implementations are smaller than FTSI connections, and memory allocation and complexity are also reduced by the present invention. Even more, the present invention substantially reduces pollution of the processor cache with network subsystem data structures and increases performance.

In one embodiment, there is provided a method for use by edge device 510 for establishing a connection with server 550 to support full TCP connection 502 between a client (not shown) and edge device 510. The method comprises establishing full TCP connection 525 with server 550 using full TCP socket 545, allocating first light TCP socket 518 for supporting a first light TCP connection of LTSI connection 520 with server 550, associating a first light session ID with the first light TCP connection of LTSI connection 520, sending a first open session message to server 550 via full TCP connection 525 with server 550, establishing the first light TCP connection of LTSI connection 520 with server 550 via full TCP connection 525, associating first data with the first light session ID, and delivering the first data associated with the first light session ID to server 550 using the first light TCP connection of LTSI connection 520 via full TCP connection 525.

In another embodiment, prior to establishing full TCP connection 525 with server 550, the method may further comprise receiving a first client request for client connection 502. In yet another embodiment, after establishing full TCP connection 525 with server 550 occurs, full TCP connection 525 is maintained persistently even without a client connection being present or requested. In one embodiment, full TCP connection 525 is the only full TCP connection between edge device 510 and server 550, and full TCP connection 550 supports a plurality of light TCP connections 520 including the first light TCP connection.

Further, the method may also comprise receiving a second client request for second connection 504, allocating second light TCP socket 528 for supporting a second light TCP connection of LTSI connections 520 with server 550, associating a second light session ID with the second light TCP connection of LTSI connections 520, sending a second open session message to server 550 via full TCP connection 525 with server 550, establishing the second light TCP connection of LTSI connections 520 with server 550 via full TCP connection 525, associating second data with the second light session ID, and delivering the second data associated with the second light session ID to server 550 using the second light TCP connection of LTSI connections 520 via full TCP connection 525.

In yet another embodiment, there is provided a method for use by server 550 for establishing a connection with edge device 510 to support full TCP connection 502 between a client (not shown) and edge device 510. The method comprises establishing full TCP connection 525 with edge device 510 using full TCP socket 555, receiving a first open session message from edge device 510 via full TCP connection 525 with edge device 510, allocating first light TCP socket 554 for supporting a first light TCP connection of LTSI connections 520 with edge device 510, associating a first light session ID with the first light TCP connection of LTSI connections 520, establishing the first light TCP connection of LTSI connections 520 with edge device 510 via full TCP connection 525, associating first data with the first light session ID, and delivering the first data associated with the first light session ID to edge device 510 using the first light TCP connection of LTSI connections 520 via full TCP connection 525.

In an additional embodiment, prior to establishing full TCP connection 525 with server 550, edge device 510 may receive a first client request for first connection 515. In yet another embodiment, after establishing full TCP connection 525 with edge device 510 occurs, full TCP connection 525 is maintained persistently even without a client connection being present or requested. In one embodiment, full TCP connection 525 is the only full TCP connection between edge device 510 and server 550, and full TCP connection 550 supports a plurality of light TCP connections 520 including the first light TCP connection.

Further, the method may also comprise receiving a second open session message from edge device 510 via full TCP connection 525 with edge device 510, allocating a second light TCP socket for supporting a second light TCP connection of LTSI connections 520 with edge device 510, associating a second light session ID with the second light TCP connection of LTSI connections 520, establishing the second light TCP connection of LTSI connections 520 with edge device 510 via full TCP connection 525, associating second data with the second light session ID, and delivering the second data associated with the second light session ID to edge device 510 using the second light TCP connection of LTSI connections 520 via full TCP connection 525.

Now, turning to server 550 of FIG. 5, in one embodiment of the present invention, there is provided server 550 for establishing a connection with edge device 510 to support full TCP connection 502 between a client (not shown) and edge device 510. In such embodiment, server 550 comprises full TCP module 555 configured to establish full TCP connection 525 with edge device 510 using a full TCP socket of full TCP module 555, where the full TCP socket is configured to receive a first open session message from edge device 510 via full TCP connection 525 with edge device 510. Server 550 also comprises a first light TCP socket of first light TCP module 554, which is configured to support a first light TCP connection of LTSI connections 520 with edge device 510 in response to the first open session message, and is further configured to associate a first light session ID with the first light TCP connection of LTSI connections 520 and establish the first light TCP connection of LTSI connections 520 with edge device 510 via full TCP connection 525. Light TCP module 554 is also configured to associate first data with the first light session ID and deliver the first data associated with the first light session ID to edge device 510 using the first light TCP connection of LTSI connections 520 via full TCP connection 525.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by an edge device for establishing a connection with a server to support a full TCP connection between a client and the edge device, the method comprising:
   establishing a full TCP connection with the server using a full TCP socket;
   allocating a first light TCP socket for supporting a first light TCP connection with the server;
   associating a first light session ID with the first light TCP connection;
   sending a first open session message to the server via the full TCP connection with the server;
   establishing the first light TCP connection with the server via the full TCP connection;
   associating first data with the first light session ID; and
   delivering the first data associated with the first light session ID to the server using the first light TCP connection via the full TCP connection.

2. The method of claim 1, wherein prior to establishing the full TCP connection with the server, the method further comprises receiving a first client request for a first connection.

3. The method of claim 1, wherein establishing the full TCP connection with the server occurs and is maintained persistently without a client request for a connection.

4. The method of claim 1 further comprising:
   receiving a second client request for a second connection;
   allocating a second light TCP socket for supporting a second light TCP connection with the server;
   associating a second light session ID with the second light TCP connection;
   sending a second open session message to the server via the full TCP connection with the server;
   establishing the second light TCP connection with the server via the full TCP connection;
   associating second data with the second light session ID; and
   delivering the second data associated with the second light session ID to the server using the second light TCP connection via the full TCP connection.

5. The method of claim 1, wherein the full TCP connection is the only full TCP connection between the edge device and the server.

6. The method of claim 5, wherein the full TCP connection supports a plurality of light TCP connection including the first light TCP connection.

7. The method of claim 1, wherein the full TCP connection supports a plurality of light TCP connection including the first light TCP connection.

8. A method for use by a server for establishing a connection with an edge device to support a full TCP connection between a client and the edge device, the method comprising:
   establishing a full TCP connection with the edge device using a full TCP socket;
   receiving a first open session message from the edge device via the full TCP connection with the edge device;

allocating a first light TCP socket for supporting a first light TCP connection with the edge device;
associating a first light session ID with the first light TCP connection;
establishing the first light TCP connection with the edge device via the full TCP connection;
associating first data with the first light session ID; and
delivering the first data associated with the first light session ID to the edge device using the first light TCP connection via the full TCP connection.

9. The method of claim 8, wherein prior to establishing the full TCP connection with the edge device, the edge device receives a first client request for a first connection.

10. The method of claim 8, wherein establishing the full TCP connection with the edge device occurs and is maintained persistently without a client request for a connection.

11. The method of claim 8 further comprising:
receiving a second open session message from the edge device via the full TCP connection with the edge device;
allocating a second light TCP socket for supporting a second light TCP connection with the edge device;
associating a second light session ID with the second light TCP connection;
establishing the second light TCP connection with the edge device via the full TCP connection;
associating second data with the second light session ID; and
delivering the second data associated with the second light session ID to the edge device using the second light TCP connection via the full TCP connection.

12. The method of claim 8, wherein the full TCP connection is the only full TCP connection between the edge device and the server.

13. The method of claim 12, wherein the full TCP connection supports a plurality of light TCP connection including the first light TCP connection.

14. The method of claim 8, wherein the full TCP connection supports a plurality of light TCP connection including the first light TCP connection.

15. A server for establishing a connection with an edge device to support a full TCP connection between a client and the edge device, the server comprising:
a full TCP module configured to establish a full TCP connection with the edge device using a full TCP socket;
a full TCP socket configured to receive a first open session message from the edge device via the full TCP connection with the edge device;
a first light TCP socket configured to support a first light TCP connection with the edge device in response to the first open session message, and configured to associate a first light session ID with the first light TCP connection and establish the first light TCP connection with the edge device via the full TCP connection; and
a light TCP module configured to associate first data with the first light session ID and deliver the first data associated with the first light session ID to the edge device using the first light TCP connection via the full TCP connection.

16. The server of claim 15, wherein prior to establishing the full TCP connection with the edge device, the edge device receives a first client request for a first connection.

17. The server of claim 15, wherein establishing the full TCP connection with the edge device occurs and is maintained persistently without a client request for a connection.

18. The server of claim 15, wherein the full TCP socket is further configured to receive a second open session message from the edge device via the full TCP connection with the edge device, and wherein the server further comprises:
a second light TCP socket configured to support a second light TCP connection with the edge device, and configured to associate a second light session ID with the second light TCP connection and establish the second light TCP connection with the edge device via the full TCP connection; and
a light TCP module configured to associate second data with the second light session ID and deliver the second data associated with the second light session ID to the edge device using the second light TCP connection via the full TCP connection.

19. The server of claim 15, wherein the full TCP connection is the only full TCP connection between the edge device and the server.

20. The server of claim 15, wherein the full TCP connection supports a plurality of light TCP connection including the first light TCP connection.

* * * * *